United States Patent
Setter et al.

(10) Patent No.: US 11,657,662 B2
(45) Date of Patent: *May 23, 2023

(54) RIPPLE NETWORK ACCESS CONTROL SYSTEM

(71) Applicant: Schlage Lock Company LLC, Carmel, IN (US)

(72) Inventors: Andrew Setter, Rochester, MN (US); Joseph W. Baumgarte, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 140 days.

This patent is subject to a terminal disclaimer.

(21) Appl. No.: 17/209,984

(22) Filed: Mar. 23, 2021

(65) Prior Publication Data

US 2022/0012965 A1    Jan. 13, 2022

Related U.S. Application Data

(62) Division of application No. 16/246,973, filed on Jan. 14, 2019, now Pat. No. 10,957,134.

(51) Int. Cl.
G08C 17/02 (2006.01)
A63H 30/04 (2006.01)
(Continued)

(52) U.S. Cl.
CPC ......... G07C 9/00571 (2013.01); G08C 17/02 (2013.01); G07C 2009/00769 (2013.01); G08C 2201/12 (2013.01)

(58) Field of Classification Search
CPC .............................................. G07C 9/00571
See application file for complete search history.

(56) References Cited

U.S. PATENT DOCUMENTS 7,346,331 B2  3/2008  Taylor et al.
7,639,117 B2  12/2009  Weimeyer
(Continued)

FOREIGN PATENT DOCUMENTS

WO  2018148420 A1  8/2018

OTHER PUBLICATIONS

Canadian Examination Report; Canadian Intellectual Property Office; Canadian Application No. 3,127,033; dated Sep. 26, 2022; 3 pages.
(Continued)

*Primary Examiner* — Mohamed Barakat
*Assistant Examiner* — Pameshanand Mahase
(74) *Attorney, Agent, or Firm* — Taft Stettinius & Hollister LLP

(57) ABSTRACT

An exemplary method includes operating an access control device in a standalone mode, which involves controlling a locked/unlocked state of the access control device locally, and operating a wireless transceiver of the access control device in a lower-power state in which the wireless transceiver is operable to receive a lockdown signal from an external device. The method further includes operating the access control device in a networked lockdown mode in response to receiving the lockdown signal from the external device. Operating the access control device in the networked lockdown mode involves placing the access control device in a locked state, establishing a wireless communication connection with the external device via the wireless transceiver while operating the wireless transceiver in a higher-power state.

17 Claims, 7 Drawing Sheets

(51) Int. Cl.
    *G08C 17/00*     (2006.01)
    *G07C 9/00*     (2020.01)

(56) References Cited

U.S. PATENT DOCUMENTS

| | | | |
|---|---|---|---|
| 9,336,633 | B2 | 5/2016 | Radicella et al. |
| 9,347,242 | B2 * | 5/2016 | Cregg ............... G07C 9/23 |
| 9,934,662 | B2 | 4/2018 | Lamb et al. |
| 9,948,516 | B2 | 4/2018 | Turon et al. |
| 9,972,152 | B2 | 5/2018 | Radicella et al. |
| 9,982,462 | B2 * | 5/2018 | Lin .................. H02K 7/116 |
| 2003/0103472 | A1 | 6/2003 | Taylor et al. |
| 2013/0192316 | A1 * | 8/2013 | McKibben ......... E05B 47/0001 |
| | | | 70/279.1 |
| 2014/0163726 | A1 | 6/2014 | Shoenfeld et al. |
| 2014/0340196 | A1 | 11/2014 | Myers et al. |
| 2017/0140592 | A1 | 5/2017 | Pluss et al. |
| 2017/0301162 | A1 | 10/2017 | Radicella et al. |
| 2017/0328130 | A1 | 11/2017 | Baker et al. |
| 2017/0354023 | A1 * | 12/2017 | Dimberg ............. G05G 1/105 |
| 2018/0232976 | A1 | 8/2018 | Schoenfelder et al. |
| 2018/0315265 | A1 * | 11/2018 | Zabala Zabaleta ......... |
| | | | G07C 9/00571 |

OTHER PUBLICATIONS

International Search Report; International Searching Authority; International Application No. PCT/US2020/013502; dated Jul. 24, 2020; 4 pages.
Written Opinion of the International Searching Authority; International Searching Authority; International Application No. PCT/US2020/013502; dated Jul. 24, 2020; 10 pages.

* cited by examiner

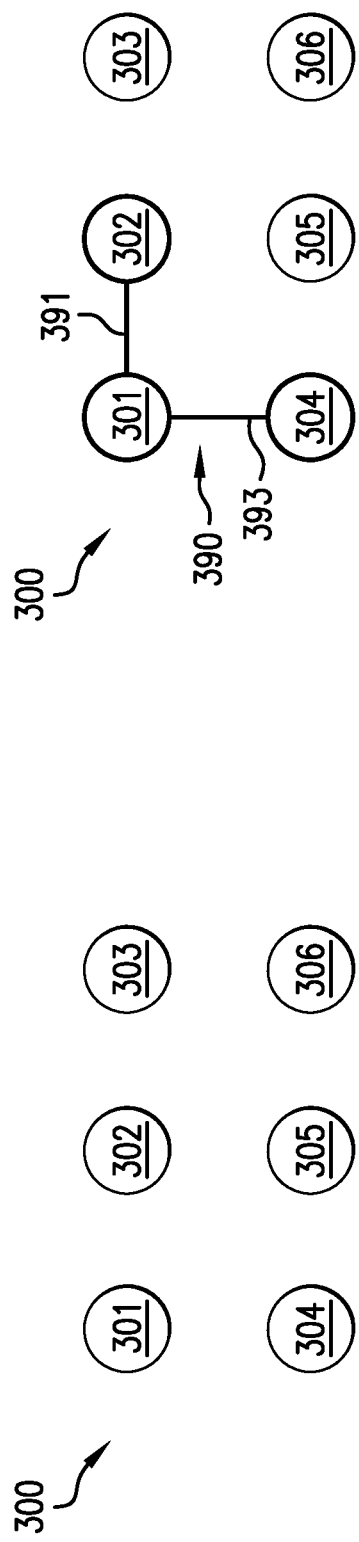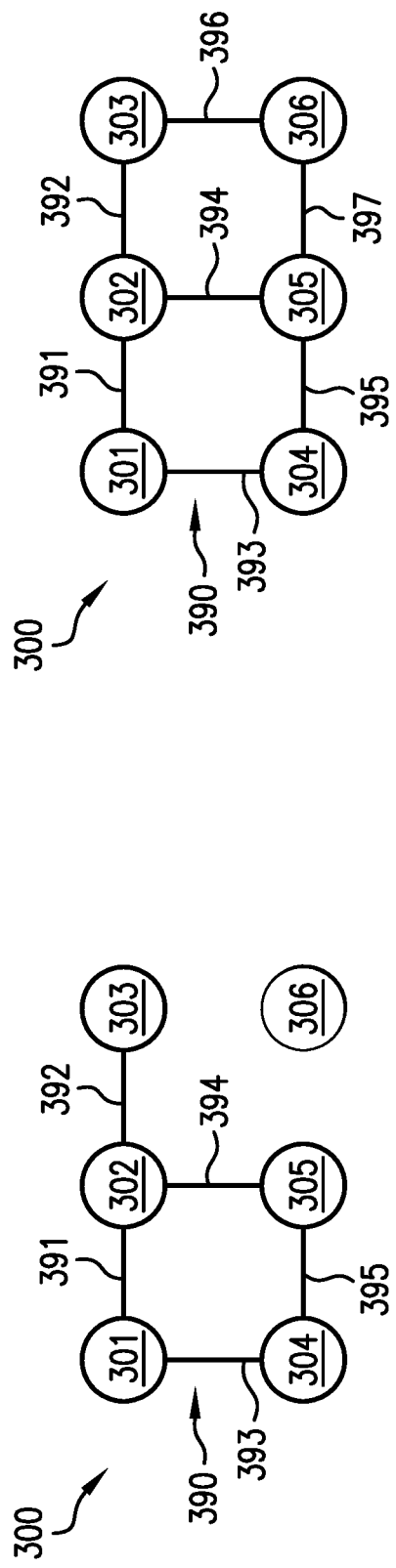

RIPPLE NETWORK ACCESS CONTROL SYSTEM

CROSS-REFERENCE TO RELATED APPLICATIONS

The present application is a divisional of U.S. patent application Ser. No. 16/246,973 filed Jan. 14, 2019 and issued as U.S. Pat. No. 10,957,134, the contents of which are incorporated herein by reference in their entirety.

TECHNICAL FIELD

The present disclosure generally relates to access control systems, and more particularly but not exclusively relates to access control systems for facilities such as schools.

BACKGROUND

Certain access control systems are provided with a centralized lockdown functionality by which an administrator can cause all locksets in the system to enter a locked state. Current access control systems providing such functionality require that the system be fully networked, which can be significantly more complex and/or expensive to purchase, install, and operate as compared to a system in which the locksets operate independently. For these reasons among others, there remains a need for further improvements in this technological field.

SUMMARY

An exemplary method includes operating an access control device in a standalone mode, which involves controlling a locked/unlocked state of the access control device locally, and operating a wireless transceiver of the access control device in a lower-power state in which the wireless transceiver is operable to receive a lockdown signal from an external device. The method further includes operating the access control device in a networked lockdown mode in response to receiving the lockdown signal from the external device. Operating the access control device in the networked lockdown mode involves placing the access control device in a locked state, establishing a wireless communication connection with the external device via the wireless transceiver while operating the wireless transceiver in a higher-power state. Further embodiments, forms, features, and aspects of the present application shall become apparent from the description and figures provided herewith.

BRIEF DESCRIPTION OF THE FIGURES

FIGS. 6A-6D are schematic representations of the access control system illustrated in FIG. 4 at various stages of the process illustrated in FIG. 5.

DETAILED DESCRIPTION OF ILLUSTRATIVE EMBODIMENTS

Figure 1:
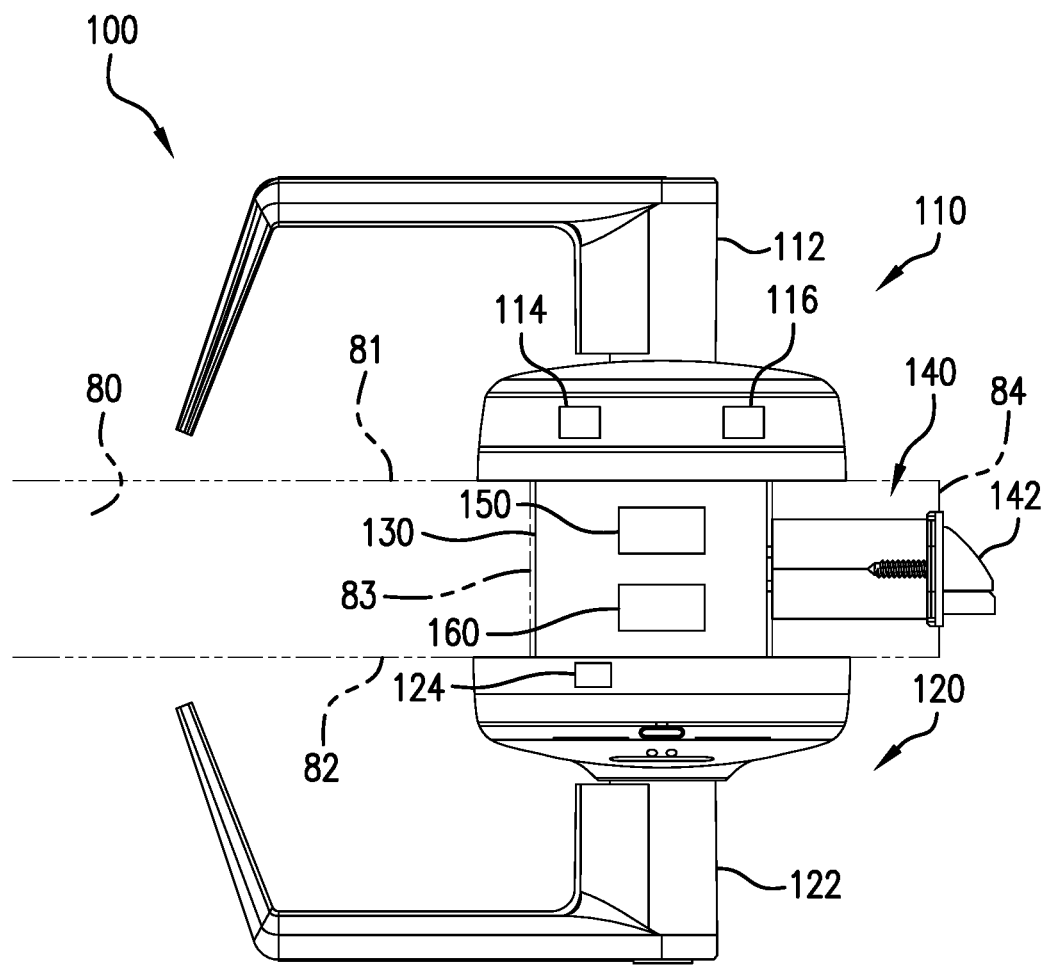
FIG. 1 is a schematic illustration of a lockset according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in certain specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

With reference to FIG. 1, illustrated therein is an access control device in the form of a lockset 100 according to certain embodiments. The lockset 100 is mounted to a door 80, and generally includes an inside assembly 110 mounted to an inner side 81 of the door 80, an outside assembly 120 mounted to an outer side 82 of the door 80, a chassis 130 mounted within a cutout 83 of the door 80 and connected with the inside assembly 110 and the outside assembly 120, and a bolt mechanism 140 operably connected with the chassis 130 and operable to extend beyond a swinging edge 84 of the door 80. The lockset 100 further includes an electronically-operable locking mechanism 150 having a locking state and an unlocking state, and a control assembly 160 operable to transition the locking mechanism 140 between the locking state and the unlocking state.

The inside assembly 110 includes an inside actuator 112 that is operably connected to the chassis 130 such that the inside actuator 112 is at least selectively operable to actuate the bolt mechanism 140. In the illustrated form, the inside actuator 112 is provided in the form of a handle, and more particularly as a lever. In other embodiments, the inside actuator 112 may be provided in another form, such as that of a knob, a thumbturn, or a pushbar mechanism. The inside assembly 110 further includes a lockdown mechanism 114, and may further include a lock state selector 116. In certain forms, the lock state selector 116 may be a mechanical lock state selector that physically drives the locking mechanism 150 between its locking state and its unlocking state. In other forms, the lock state selector 116 may be an electronic lock state selector that is in communication with the control assembly 160 and is operable to cause the control assembly 160 to transition the locking mechanism between its locking state and its unlocking state.

As described in further detail below, the lockdown mechanism 114 is operable to transmit to the control assembly 160 a lockdown signal. The lockdown mechanism 114 may take any of a number of forms. As one example, the lockdown mechanism 114 may be of the type that the user breaks glass and throws a lever. As another example, the lockdown mechanism 114 may be provided as a lock cylinder having a switch that transmits the lockdown signal when the lock cylinder is actuated. As a further example, the lockdown mechanism 114 may be provided as a credential reader that transmits the lockdown signal when an appropriate lockdown credential is presented to the credential reader.

The outside assembly 120 includes an outside actuator 122 that is operably connected to the chassis 130 such that the outside actuator 122 is selectively operable to actuate the bolt mechanism 140. In the illustrated form, the outside actuator 122 is provided in the form of a handle, and more particularly as a lever. In other embodiments, the outside actuator 122 may be provided in another form, such as that of a knob, a thumbturn, or a lock cylinder. The outside assembly 120 may further include a credential reader 124 in communication with the control assembly 160. The credential reader 124 may, for example, take the form of a card reader, a keypad, or a biometric credential reader. During normal operation of the lockset 100, presentation of an appropriate credential to the credential reader 124 (e.g., by inputting a code or presenting a card, a fob, or a biometric input) causes the control assembly 160 to transition the locking mechanism 150 from the locked state to the unlocked state to selectively permit actuation of the bolt mechanism 140 by the outside actuator 122. In certain forms, the credential reader 124 may be considered a lock state selector.

The chassis 130 is mounted within the door cutout 83 and at least selectively connects each of the actuators 112, 122 with the bolt mechanism 140. The chassis 130 may, for example, take the form of a mortise-format chassis, a cylindrical-format chassis, or a tubular-format chassis, the features of which will be readily apparent to those skilled in the art. The chassis 130 has a locked state and an unlocked state. In the unlocked state, the chassis 130 maintains the bolt mechanism 140 in a retracted state and/or permits the outside assembly 120 to retract the bolt mechanism 140. In the locked state, the chassis 130 maintains the bolt mechanism 140 in an extended state and/or prevents the outside assembly 120 from retracting the bolt mechanism 140. The chassis 130 may be transitioned between the locked state and the unlocked state by the electronic locking mechanism 150.

The bolt mechanism 140 includes a bolt 142 having an extended position and a retracted position. With the bolt 142 in the extended position and the door 80 in the closed position, the bolt 142 extends into the doorframe and retains the door 80 in the closed position. When the bolt 142 is retracted, the door 80 is free to move to the open position. In the illustrated form, the bolt mechanism 140 is provided in the form of a latchbolt mechanism, and includes a spring-loaded latchbolt 142 that is biased toward its extended position. In other forms, the bolt mechanism 140 may be provided in the form of a deadbolt mechanism, and may include a bolt 142 in the form of a deadlocking deadbolt. Additionally, while the illustrated bolt mechanism 140 is provided adjacent the chassis 130, it is also contemplated that the bolt mechanism 140 may be positioned remotely from the chassis 130.

The electronic locking mechanism 150 may be mounted within the chassis 130, and has an unlocking state in which the door 80 can be opened from the outer side 82 (e.g., by operating the outside actuator 122 and/or pulling the door 80 toward its open position), and a locking state in which the door 80 cannot be opened from the outer side 82. In the illustrated form, the locking mechanism 150 prevents the outside actuator 122 from actuating the bolt mechanism 140 when in the locking state, and permits the outside actuator 122 to actuate the bolt mechanism 140 when in the unlocking state. In other forms, the locking mechanism 140 may retract the bolt 142 when transitioned from the locking state to the unlocking state, and may extend the bolt 142 when transitioned from the unlocking state to the unlocking state.

Figure 2:
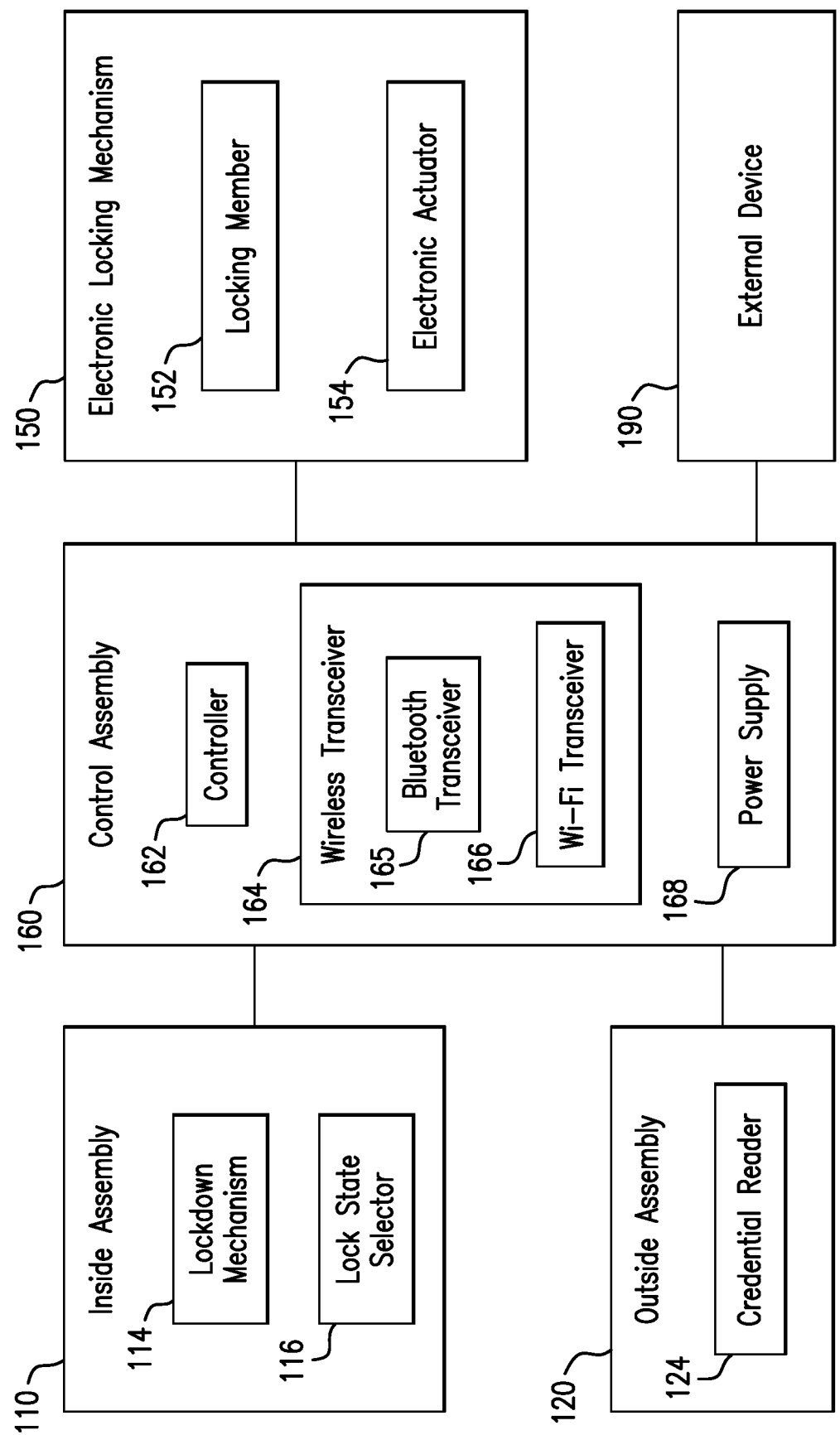
FIG. 2 is a schematic block diagram of a control assembly according to certain embodiments.

With additional reference to FIG. 2, the electronic locking mechanism 150 includes a locking member 152 having a locking position and an unlocking position, and an electronic actuator 154 operable to drive the locking member 152 between the locking position and the unlocking position to thereby adjust the locked/unlocked state of the lockset 100. In certain forms, the locking member 152 may be configured to selectively prevent the outside actuator 122 from retracting the bolt 142. As one example, the outside actuator 122 may be operably coupled with the bolt mechanism 140 such that rotation of the actuator 122 retracts the bolt 142, and the locking member 152 may prevent rotation of the actuator 122 when in the locking position. As another example, the outside actuator 122 may be selectively coupled with the bolt mechanism 140 via the locking member 152. In such forms, rotation of the actuator 122 may cause retraction of the bolt 142 when the locking member 152 is in its unlocking position, and the actuator 122 may freewheel without causing retraction of the bolt 142 when the locking member 152 is in its locking position. In further embodiments, the locking member 152 may be provided as the bolt 142 such that the locking mechanism 150 drives the bolt 142 between its extended locking position and its retracted unlocking position without requiring operation of either manual actuator 112, 122.

The control assembly 160 includes a controller 162 and a wireless transceiver 164 that facilitates communication between the controller 162 and one or more external devices 190, and may further include an onboard power supply 168. As described herein, the external device 190 may be provided in the form of an additional lockset 100. The controller 162 is in communication with the lockdown mechanism 114, the credential reader 124, and the locking device 150, and is configured to control operation of the locking device 150 based in part upon information received from the lockdown mechanism 114 and the credential reader 124. For example, when an appropriate credential is presented to the credential reader 124, the controller 162 may transmit an unlock signal that transitions the locking device 150 from the locking state to the unlocking state to thereby permit opening of the door 80 from the outer side 82 thereof. As described herein, the controller 162 is also configured to initiate a lockdown operation in response to receiving a lockdown signal from the lockdown mechanism 114 and/or from the external device 190 via the wireless transceiver 164. The wireless transceiver 164 may, for example, include a Wi-Fi transceiver 165 and/or a Bluetooth transceiver 166, such as a Bluetooth Low Energy (BLE) transceiver. It is also contemplated that the wireless transceiver 165 may include wireless transceivers of another type, such as a Zigbee transceiver and/or a Zwave transceiver.

The lockset 100 is configured to selectively operate in each of a lower-power standalone mode and a higher-power networked or lockdown mode. When operating in the standalone mode, operation of the lockset 100 is controlled locally, and the control assembly 160 is not in communication with the external device 190. Thus, in the standalone mode, the locked/unlocked state of the chassis 130 may be altered by the lock state selector 116 and/or the credential reader 124, for example by causing the controller 162 to transmit lock and unlock signals that transition the locking device 150 between its locking state and its unlocking state.

As noted above, when operating in the standalone mode, the operation of the lockset 100 is controlled locally, and the control assembly 160 need not be in communication with the external device 190. Thus, in order to conserve power, the control assembly 160 may operate the wireless transceiver 164 in a lower-power mode when the lockset 100 is operating in the standalone mode, and may operate the wireless transceiver 164 in a higher-power mode when the lockset 100 is operating in the networked mode. As will be appreciated, the wireless transceiver 164 consumes less electrical power when operating in the lower-power mode than when operating in the higher-power mode.

In certain forms, the wireless transceiver 164 may include a Bluetooth transceiver 166 having a normal-power active state and a low-power sleep state. In such forms, the lower-power mode of the wireless transceiver 164 may involve the Bluetooth transceiver 166 operating in the sleep state, and the higher-power mode of the wireless transceiver 164 may involve the Bluetooth transceiver 166 operating in the active state. In certain forms, the wireless transceiver 164 may further include a Wi-Fi transceiver 165. In such forms, the lower-power mode of the wireless transceiver 164 may involve operating the Bluetooth transceiver 166 in either the sleep state or the active state while the Wi-Fi transceiver 165 is disabled, and the higher-power mode of the wireless transceiver 164 may involve operating the Wi-Fi transceiver 165.

Figure 3:
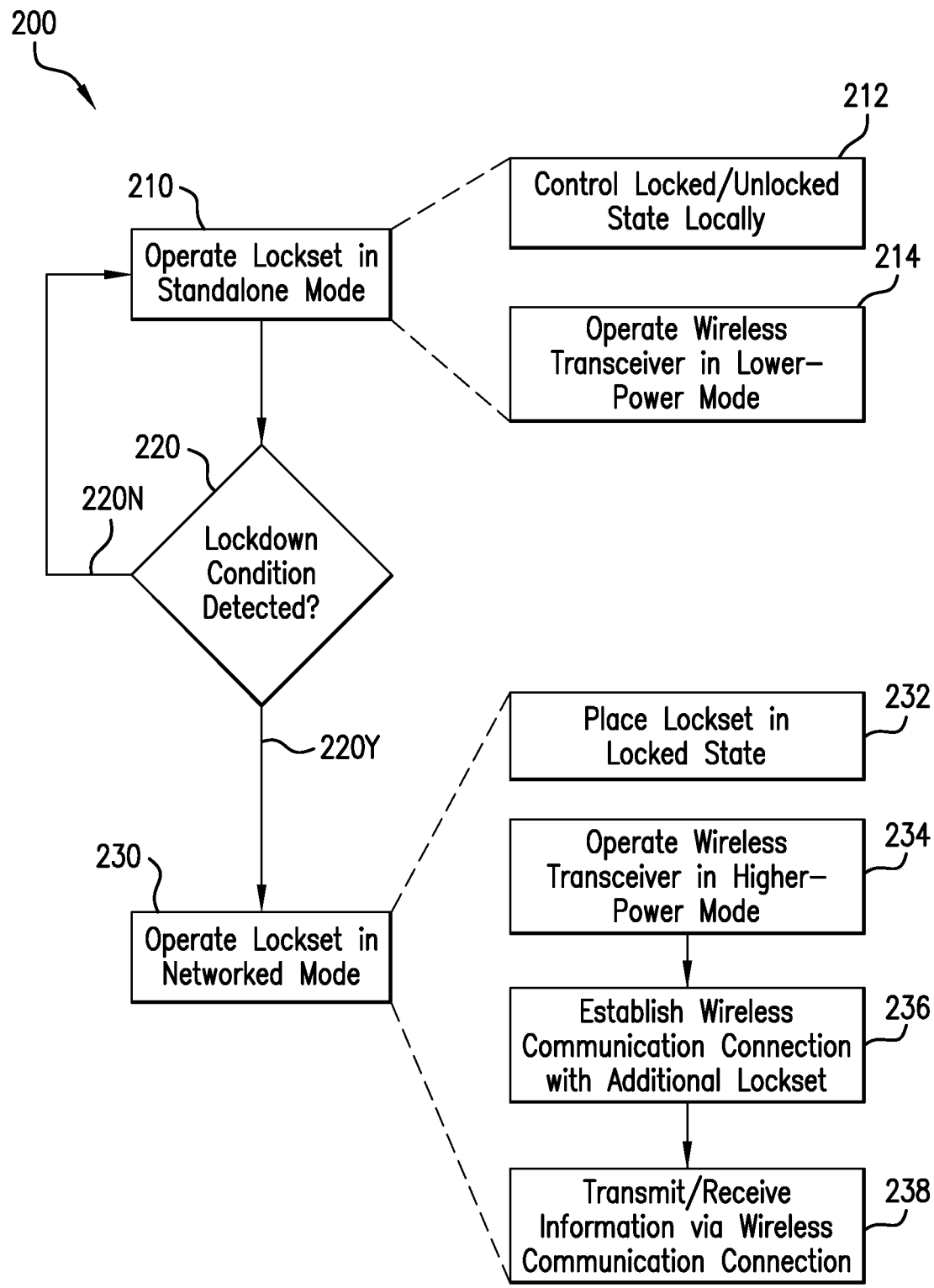
FIG. 3 is a schematic flow diagram of a process according to certain embodiments.

With additional reference to FIG. 3, illustrated therein illustrated therein is an exemplary process 200 that may be performed using the lockset 100. Operations or blocks illustrated for the processes in the present application are understood to be examples only, and operations may be combined or divided, and added or removed, as well as re-ordered in whole or in part, unless explicitly stated to the contrary.

The process 200 may begin with block 210, which generally involves operating the lockset 100 in the standalone mode. As noted above, when operating in the standalone mode, the locked/unlocked state of the lockset 100 is controlled locally, for example by operation of the lock state selector 116 and/or the credential reader 124. Thus, block 210 involves block 212, which generally involves controlling the locked/unlocked state of the lockset 100 locally. Additionally, the wireless transceiver 164 is operating in the lower-power state to conserve power in the onboard power supply 168. As such, block 210 also involves block 214, which generally involves operating the wireless transceiver 164 in the lower-power state.

When operating in the standalone mode, the lockset 100 is operable to detect a lockdown condition at block 220. In certain circumstances, the lockdown condition may be initiated locally, for example by the lockdown mechanism 114. In other circumstances, the lockdown condition may be initiated remotely, such as by the external device 190. For example, the external device 190 may transmit the lockdown signal in a manner that the wireless transceiver 164 is operable to receive while operating in the lower-power mode. Alternatively, the external device 190 may first cause the wireless transceiver 164 to transition to the higher-power mode to establish a wireless communication connection with the external device 190, and subsequently transmit the lockdown signal via the wireless communication connection. If the lockdown condition is not detected 220N, the lockset 100 continues to operate in the standalone mode at block 210.

Upon receiving the lockdown signal at the lockset 100, the lockdown condition is detected 220Y to satisfy block 220, and the process 200 continues to block 230, which generally involves operating the lockset 100 in the networked mode. Block 230 includes block 232, which involves placing the lockset 100 in the locked state. Block 232 may, for example, involve transmitting a lock signal from the controller 162 to the electronic locking mechanism 150, thereby causing the actuator 154 to place the locking member 152 in the locking position.

Block 230 also includes block 234, which generally involves operating the wireless transceiver 164 in the higher-power mode. For example, block 234 may involve waking the Bluetooth transceiver 166 and/or activating the Wi-Fi transceiver 165. With the wireless transceiver 164 operating in the higher-power mode, block 230 continues to block 236, which generally involves establishing a wireless communication connection with at least one external device 190, such as at least one additional lockset 100. As one example, in circumstances in which the lockdown condition was initiated locally (e.g., by the lockdown mechanism 114), block 236 may involve establishing the wireless communication with an additional lockset 100. As another example, in circumstances in which the lockdown condition was initiated remotely (e.g., by the additional lockset 100), block 236 may involve establishing the wireless communication with the lockset 100 that initiated the lockdown condition, and may further include establishing a second wireless communication connection with a further lockset 100.

With the wireless communication connection established between the lockset 100 and the at least one external device 190 (e.g., the at least one additional lockset 100), block 230 continues to block 238, which generally involves transmitting information to and/or receiving information from the external device 190. For example, in circumstances in which the lockdown condition was initiated locally, block 238 may involve transmitting the lockdown signal to the additional lockset 100 to thereby cause the additional lockset 100 to perform blocks 220 and 230. In certain forms, the wireless communication connection may be established as a result of the transmission of the lockdown signal. For example, the Bluetooth transceiver 166 of the lockset 100 may be paired with the Bluetooth transceiver 166 of the additional lockset 100 such that the additional lockset 100 is operable to receive the lockdown signal while operating in the standalone mode. In such forms, the additional lockset 100 may cause the Bluetooth transceiver 166 thereof to awaken in response to receiving the lockdown signal, thereby establishing a persistent connection between the paired devices.

As another example, in circumstances in which the lockdown condition was initiated remotely by a first additional lockset 100, block 238 may involve transmitting the lockdown signal to a second additional lockset 100, thereby satisfying block 220 at the second additional lockset 100 and causing the second additional lockset 100 to initiate block 230. Block 238 may further involve transmitting information related to the locked/unlocked status of the lockset 100 and/or the additional locksets 100. For example, upon placing the lockset 100 in the locked state, the lockset 100 may transmit to the one or more external devices 190 a confirmation that the lockset 100 has been placed in the locked state, thereby facilitating the formation of an audit trail. As described in further detail below, such an audit trail may be accessed at either the lockset 100 or the external device 190.

While the blocks of the process 200 are illustrated in one particular order, it is to be appreciated that the blocks may be reordered unless explicitly stated to the contrary. For example, while block 220 is illustrated as occurring before block 230, to be appreciated that the lockdown signal detected at block 220 may be sent via the wireless communication connection established in block 236. Alternatively, as noted above, the receipt of the lockdown signal may itself cause the wireless transceiver 164 to transition from the lower-power mode to the higher-power mode, for example in embodiments in which Bluetooth transceivers of the lockset 100 and the external device 190 are paired.

Figure 4:
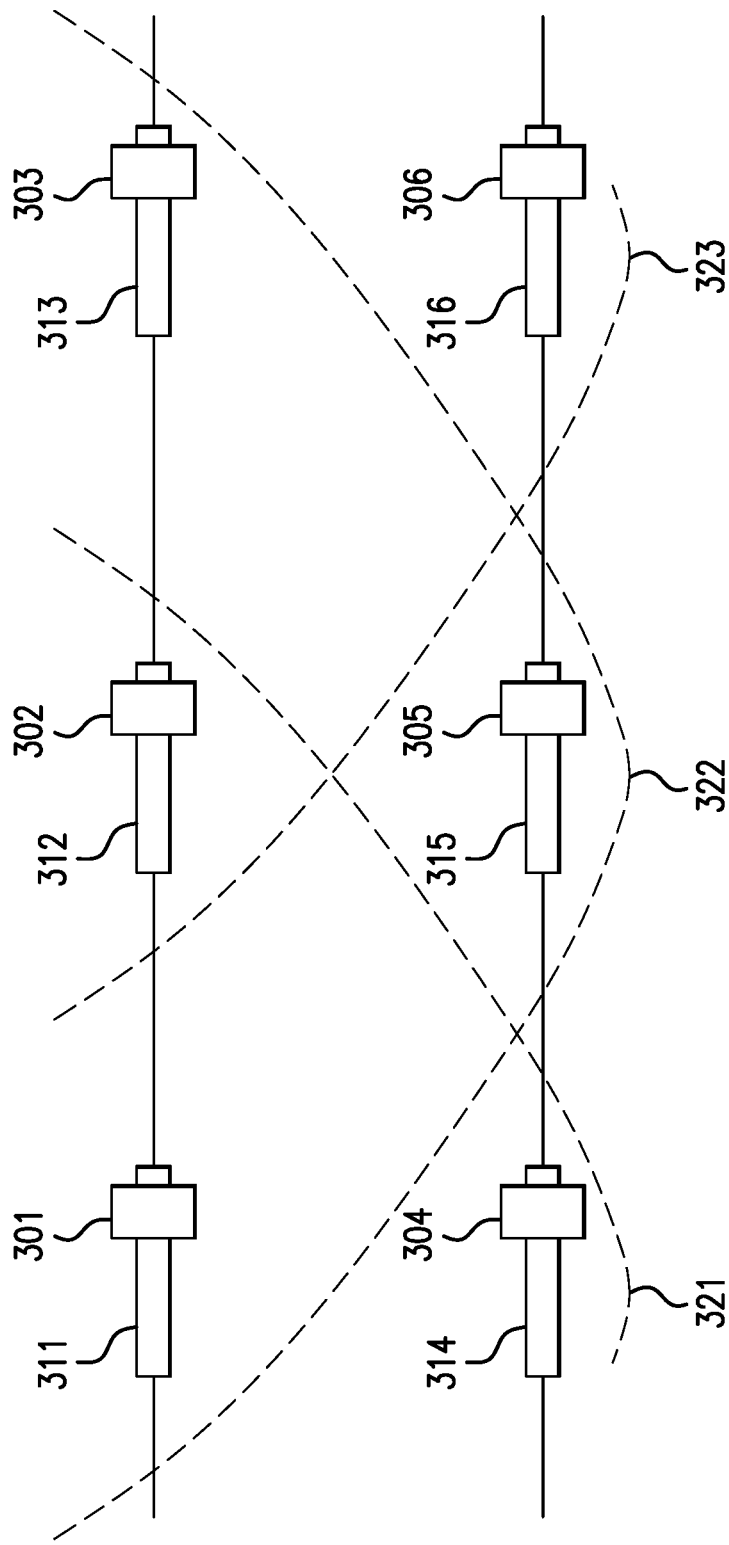
FIG. 4 is a schematic representation of an access control system according to certain embodiments.

With additional reference to FIG. 4, illustrated therein is a schematic representation of an access control system 300 according to certain embodiments. The access control system 300 includes a plurality of access control devices, one or more of which may, for example, be provided in the form of the above-described lockset 100. The access control system 300 includes first through sixth locksets 301-306, each of which is mounted to a corresponding and respective door 311-316 and has an associated wireless communication range. For example, the first lockset 301 is mounted to a first door 311, and has a first wireless communication range 321 within which the second lockset 302 and the fourth lockset 304 are located. Similarly, the second lockset 302 is mounted to a second door 312, and has a second wireless communication range 322 within which the first, third, and fifth locksets 301, 303, 305 are located. The third lockset 303 is located outside the first wireless communication range 321, and has a third wireless communication range 323 within which the second and sixth locksets 302, 306 are located. In the interest of clarity, the wireless communication ranges for the fourth through sixth locksets 304-306 are not illustrated. As described herein, the access control system 300 is configured to operate the plurality of locksets 301-306 in the standalone mode during normal operation, and to operate in a networked mode in response to a lockdown condition being detected at any of the locksets 301-306.

Figure 5:
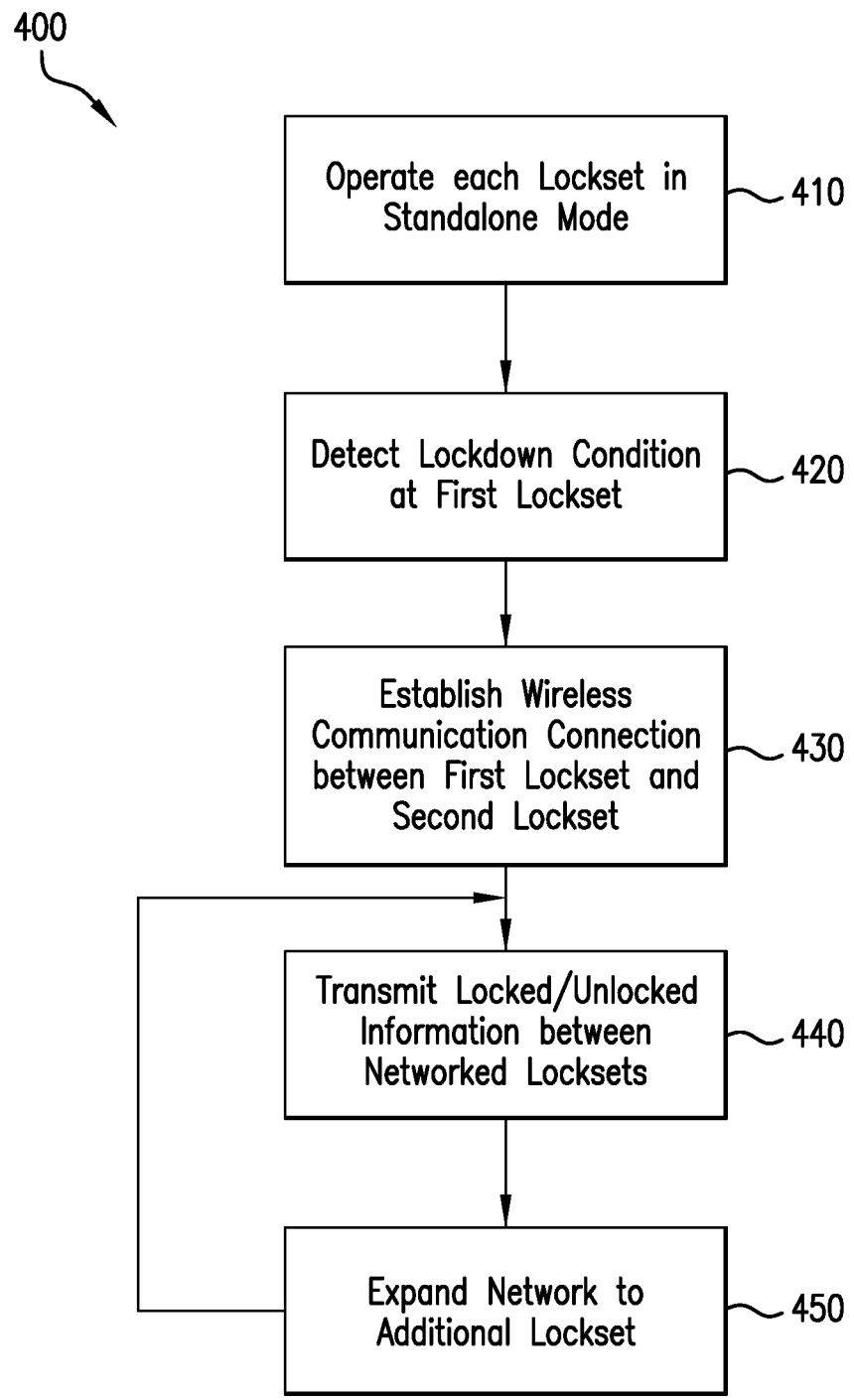
FIG. 5 is a schematic flow diagram of a process according to certain embodiments.

With additional reference to FIG. 5, illustrated therein is a process 400 according to certain embodiments, which is an example use case scenario for the access control system 300. The illustrated process 400 generally involves operating each lockset 100 in the access control system 300 according to the process 200. The process 400 thus begins with block 410, which generally involves operating each of the locksets 301-306 in the standalone mode (FIG. 6A). Thus, in block 410, each lockset 301-306 operates as described above with reference to the lockset 100 and block 210. With each lockset 301-306 operating in the standalone mode, the locksets 301-306 are not in communication with one another, and the locked/unlocked state of each lockset 301-306 is controlled locally.

In block 420, a lockdown condition is initiated at the first lockset 301, for example by a user operating the lockdown mechanism 114 of the first lockset 301. The lockdown mechanism 114 of the first lockset 301 transmits the lockdown signal to the controller 162 of the first lockset 301, thereby satisfying block 220 and causing the first lockset 301 to perform block 230 of the process 200. Thus, the lockset 301 transitions to its locked state in block 232, and begins operation of its wireless transceiver 164 in the higher-power state in block 234.

The process 400 also includes block 430, which generally involves establishing a wireless communication connection 391 between the first lockset 301 and the second lockset 302 (FIG. 6B). In other words, block 430 involves the first lockset 301 performing block 236 of the process 200 to establish the wireless communication connection 391 with the second lockset 302, thereby forming a network 390. For example, block 430 may involve transmitting the lockdown signal from the first lockset 301 to the second lockset 302 to satisfy block 220 at the second lockset 302, thereby causing the second lockset 302 to initiate block 230 of the process 200. In the illustrated form, the fourth lockset 304 is also located within the wireless communication range 321 of the first lockset 301. As such, block 430 may further include causing the first lockset 301 to perform block 236 to establish an additional wireless communication connection 394 with the fourth lockset 304 such that the network 390 includes the fourth lockset 304.

Upon establishing the initial network 390 in block 430, the process 400 may continue to block 440, which generally involves transmitting lock/unlock information between the networked locksets 301, 302, 304. For example, the first lockset 301 may transmit to the second lockset 302 and the fourth lockset 304 information indicating that the first lockset 301 has successfully been transitioned to its locked state. Each of the second lockset 302 and the fourth lockset 304 likewise transmits to the first lockset 301 information relating to the locked/unlocked state thereof, thereby propagating the locked/unlocked information for each of the networked locksets 301, 302, 304 throughout the network 390. Each of the networked locksets 301, 302, 304 stores the information in an audit trail such that the information relating to the locked/unlocked state of each networked lockset 301, 302, 304 can be accessed from any of the locksets 301, 302, 304 in the network 390. The information communicated in block 440 may further include information relating to which of the locksets 301-306 initiated the lockdown condition, and such information may additionally be stored in the audit trail. It is also contemplated that the audit trail may include additional information. For example, one or more of the locksets may include additional or alternative sensors (e.g., a door position sensor, a request to exit sensor, and/or other sensors), and the audit trail may be provided with information relating to the states sensed by those additional or alternative sensors.

The process 400 also includes block 450, which generally involves expanding the network 390 to at least one additional lockset. For example, block 450 may initially involve expanding the network 390 by causing the second lockset 302 to establish a wireless communication connection 392 with the third lockset 303 (FIG. 6C), thereby satisfying block 220 at the third lockset 303 and causing the third lockset 303 to initiate block 230. In the illustrated form, the fifth lockset 205 is also located within the wireless communication range 322 of the second lockset 302 and the fourth lockset 304. Accordingly, each of the second lockset 302 and the fourth lockset 304 establishes a respective wireless communication connection 394, 395 with the fifth lockset 205, thereby further expanding the network 390 (FIG. 6C).

Upon expanding the network 390 in block 450, the process 400 may return to block 440, which generally involves transmitting the locked/unlocked information among the networked locksets 301-305. For example, the second lockset 302 may transmit to each of the third lockset 303 and the fifth lockset 305 information relating to the locked/unlocked state of the first and fourth locksets 301, 304, and each of the third lockset 303 and the fifth lockset 305 may transmit to the second lockset 302 information indicating that the lockset 303/305 has successfully transitioned to the locked state. The second lockset 302 may transmit such information regarding the locked/unlocked states of the third and fifth locksets 303, 305 to the first lockset 301, which may relay such information to the fourth lockset 304. As will be appreciated, the information relating to the locked/unlocked states of the third and fifth locksets 303, 305 may additionally or alternatively be received at the fourth lockset 304 via the fifth lockset 305 due to the presence of the wireless communication connection 395 between the fourth and fifth locksets 304, 305. In either event, the information related to the locked/unlocked states of all networked locksets 301-305 is propagated throughout the network 390.

As will be appreciated, block 450 may be repeated as needed to expand the network 390 to all locksets within the access control system 300, for example by causing the third and fifth locksets 303, 305 to form respective wireless communication connections 396, 397 with the sixth lockset 306 (FIG. 6D). Similarly, block 440 may be repeated as needed to ensure that each networked lockset 301-306 has information relating to the locked/unlocked states of each other networked lockset 301. As such, an authorized user may interface with any of the locksets 301-306 to determine which locksets have successfully entered the lockdown mode and which locksets have not. Thus, while the network 390 is not a true mesh network (in which each node is connected to each other node), the locksets 301-306 operate as peer nodes within the network 390. Information regarding any lockset within the network 390 can be obtained from any of the networked locksets, thereby obviating the need for a central access control device to which all peripheral access control devices report.

As noted above, the wireless transceiver 164 for each lockset 100 may include a Bluetooth transceiver 166. Those skilled in the art will readily appreciate that such Bluetooth transceivers 166 are operable to receive wake signals from other Bluetooth-enabled devices while operating in the low-power sleep mode. However, certain protocols require that the Bluetooth transceivers 166 be paired to provide for this wake-up functionality. Accordingly, a commissioning stage of the process 400 may involve pairing those devices that are within wireless communication range of one another. For example, such a commissioning step may involve pairing the first lockset 301 with each of the second and fourth locksets 302, 304, pairing the second lockset 302 with the first, third, and fifth locksets 301, 304, 305, and pairing the third lockset 303 with the second and sixth locksets 302, 306. The commissioning step may further involve pairing the fourth lockset 304 with the first and fifth locksets 301, 305, pairing the fifth lockset 305 with the second, fourth, and sixth locksets 302, 304, 306, and pairing the sixth lockset 306 with the third and fifth locksets 303, 305.

In the form described hereinabove, the lockdown condition is initiated at the first lockset 301, which forms the initial network 390 by establishing wireless communication connections 391, 393 with the second and fourth locksets 302, 304. The network 390 then expands or ripples outward to the third and fifth locksets 303, 305, and finally to the sixth lockset 306. It should be appreciated, however, that the lockdown condition may be initiated at any lockset 301-306 within the access control system 300. For example, the lockdown condition may be initiated at the second lockset 302 such that the initial network includes the first, third, and fifth locksets 301, 303, 305, and ripples outward to the fourth and sixth locksets 304, 306. Furthermore, while the locksets are illustrated as being in direct communication with one another, it is also contemplated that the effective wireless communication range of one or more locksets may be increased by the use of a repeater.

As will be appreciated, once the network 390 has been established, each lockset 301-306 is in direct or indirect communication with each other lockset 301-306 in the quasi-mesh network 390. Thus, the network 390 is capable of rapidly propagating information among the locksets 301-306, such as information relating to the locked/unlocked state of the locksets 301-306 and/or commands to terminate the lockdown. Thus, in addition to providing an audit trail that is accessible from any of the locksets 301-306, the lockdown can be easily terminated at any of the locksets 301-306, for example by operating the lockdown mechanism 114 in reverse.

It should further be appreciated that the access control system 300 may represent significant cost savings over traditional networked access control systems. For example, certain conventional networked access control systems require that the locksets always be in wireless communication with one another and/or a central access control device in order for a lockdown condition to be propagated throughout the system. Due to the power requirements of the wireless transceivers, it is typically infeasible to operate the locksets off of battery power. As such, the access control devices must be connected to line power, which represents a significant installation cost. By contrast, the systems and methods described herein enable each lockset 100 or access control device to operate in a lower-power standalone mode during normal operation, and transition to the higher-power networked mode only when the lockdown is to be initiated. Accordingly, at least some embodiments of the lockset 100 can be run on battery power (e.g., power from the onboard power supply 168) without requiring connection to line power.

Additionally, while the access control system 300 is illustrated as including a plurality of locksets 100, it is to be appreciated that one or more of the above-described locksets 301-306 may be replaced with an access control device of a different form. For example, one or more of the locksets 301-306 may instead be provided in the form of an exit device. It should also be appreciated that while the access control system 300 is illustrated as including six locksets 301-306, the access control system 300 may include a different number of access control devices. Furthermore, although each of the locksets 301-306 in the illustrated system is in the wireless communication range of two or more other locksets, those skilled in the art will readily recognize that one or more of the locksets may instead be within the communication range of only one other lockset. Where desired, one or more repeaters or gateways may be utilized to extend the effective wireless communication range(s) of one or more locksets.

Figure 7:
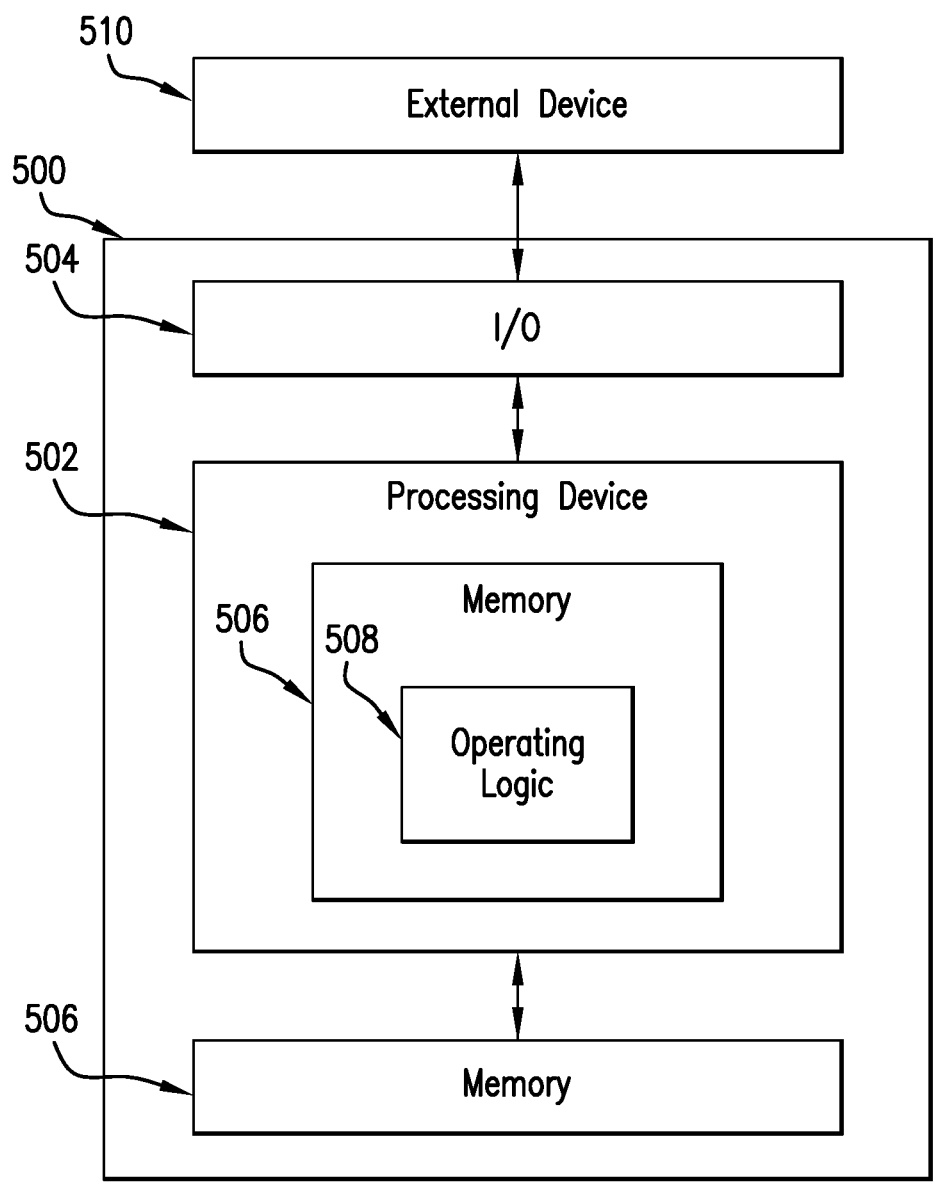
FIG. 7 is a schematic block diagram of a computing device.

Referring now to FIG. 7, a simplified block diagram of at least one embodiment of a computing device 500 is shown. The illustrative computing device 500 depicts at least one embodiment of a credential management system, a credential tracking system, a credential ordering system, a key management system, an administrative system, a mobile access hub, a mobile device, an access control edge system, an access control edge device, a reader device, a lock device, an access controller, and/or a gateway device that may be utilized in connection with the lockset 100, the lockdown mechanism 114, the lock state selector 116, the credential reader 124, the control assembly 160, the controller 162, the electronic locking mechanism 150, and/or the external device 190 illustrated in FIGS. 1 and 2.

Depending on the particular embodiment, computing device 500 may be embodied as a server, desktop computer, laptop computer, tablet computer, notebook, netbook, Ultrabook™ mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 500 includes a processing device 502 that executes algorithms and/or processes data in accordance with operating logic 508, an input/output device 504 that enables communication between the computing device 500 and one or more external devices 510, and memory 506 which stores, for example, data received from the external device 510 via the input/output device 504.

The input/output device 504 allows the computing device 500 to communicate with the external device 510. For example, the input/output device 504 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 500. The input/output device 504 may include hardware, software, and/or firmware suitable for performing the techniques described herein.

The external device 510 may be any type of device that allows data to be inputted or outputted from the computing device 500. For example, in various embodiments, the external device 510 may be embodied as the access control device 100, the inside assembly 110, the outside assembly 120, the lock device 150, and/or the control assembly 160. Further, in some embodiments, the external device 510 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 510 may be integrated into the computing device 500.

The processing device 502 may be embodied as any type of processor(s) capable of performing the functions described herein. In particular, the processing device 502 may be embodied as one or more single or multi-core processors, microcontrollers, or other processor or processing/controlling circuits. For example, in some embodiments, the processing device 502 may include or be embodied as an arithmetic logic unit (ALU), central processing unit (CPU), digital signal processor (DSP), and/or another suitable processor(s). The processing device 502 may be a programmable type, a dedicated hardwired state machine, or a combination thereof. Processing devices 502 with multiple processing units may utilize distributed, pipelined, and/or parallel processing in various embodiments. Further, the processing device 502 may be dedicated to performance of just the operations described herein, or may be utilized in one or more additional applications. In the illustrative embodiment, the processing device 502 is of a programmable variety that executes algorithms and/or processes data in accordance with operating logic 508 as defined by programming instructions (such as software or firmware) stored in memory 506. Additionally or alternatively, the operating logic 508 for processing device 502 may be at least partially defined by hardwired logic or other hardware. Further, the processing device 502 may include one or more components of any type suitable to process the signals received from input/output device 504 or from other components or devices and to provide desired output signals. Such components may include digital circuitry, analog circuitry, or a combination thereof.

The memory 506 may be of one or more types of non-transitory computer-readable media, such as a solid-state memory, electromagnetic memory, optical memory, or a combination thereof. Furthermore, the memory 506 may be volatile and/or nonvolatile and, in some embodiments, some or all of the memory 506 may be of a portable variety, such as a disk, tape, memory stick, cartridge, and/or other suitable portable memory. In operation, the memory 506 may store various data and software used during operation of the computing device 500 such as operating systems, applications, programs, libraries, and drivers. It should be appreciated that the memory 506 may store data that is manipulated by the operating logic 508 of processing device 502, such as, for example, data representative of signals received from and/or sent to the input/output device 504 in addition to or in lieu of storing programming instructions defining operating logic 508. As illustrated, the memory 506 may be included with the processing device 502 and/or coupled to the processing device 502 depending on the particular embodiment. For example, in some embodiments, the processing device 502, the memory 506, and/or other components of the computing device 500 may form a portion of a system-on-a-chip (SoC) and be incorporated on a single integrated circuit chip.

In some embodiments, various components of the computing device 500 (e.g., the processing device 502 and the memory 506) may be communicatively coupled via an input/output subsystem, which may be embodied as circuitry and/or components to facilitate input/output operations with the processing device 502, the memory 506, and other components of the computing device 500. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 500 may include other or additional components, such as those commonly found in a typical computing device (e.g., various input/output devices and/or other components), in other embodiments. It should be further appreciated that one or more of the components of the computing device 500 described herein may be distributed across multiple computing devices. In other words, the techniques described herein may be employed by a computing system that includes one or more computing devices. Additionally, although only a single processing device 502, I/O device 504, and memory 506 are illustratively shown in FIG. 5, it should be appreciated that a particular computing device 500 may include multiple processing devices 502, I/O devices 504, and/or memories 506 in other embodiments. Further, in some embodiments, more than one external device 510 may be in communication with the computing device 500.

As used herein, "Bluetooth" includes traditional Bluetooth Basic Rate/Enhanced Rate (BR/EDR) technology and Bluetooth Low Energy (BLE) technology and refers to one or more components, architectures, communication protocols, and/or other systems, structures, or processes defined by and/or compliant with one or more Bluetooth specifications, addendums, and/or supplements overseen by the Bluetooth Special Interest Group (SIG) including, for example, active, legacy, withdrawn, deprecated, and/or subsequently introduced Bluetooth Core Specifications (CSs) (Bluetooth CS Version 1.0B, Bluetooth CS Version 1.1, Bluetooth CS Version 1.2, Bluetooth CS Version 2.0+EDR, Bluetooth CS Version 2.1+EDR, Bluetooth CS Version 3.0+HS, Bluetooth CS Version 4.0, Bluetooth CS Version 4.1, Bluetooth CS Version 4.2, Bluetooth CS Version 5.0); active, legacy, withdrawn, deprecated, and/or subsequently introduced Bluetooth Core Specification Addendums (CSAs) (Bluetooth CSA Version 1, Bluetooth CSA Version 2, Bluetooth CSA Version 3, Bluetooth CSA Version 4, Bluetooth CSA Version 5, Bluetooth CSA Version 6); Bluetooth Core Specification Supplements (CSSs) (Bluetooth CSS Version 1, Bluetooth CSS Version 2, Bluetooth CSS Version 3, Bluetooth CSS Version 4, Bluetooth CSS Version 5, Bluetooth CSS Version 6, Bluetooth CSS Version 7); active, legacy, withdrawn, deprecated, and/or subsequently introduced Bluetooth Mesh Networking Specifications (Bluetooth Mesh Profile Specification 1.0, Bluetooth Mesh Model Specification 1.0, Bluetooth Mesh Device Properties 1.0); active, legacy, withdrawn, deprecated, and/or subsequently introduced Bluetooth Traditional Profile Specifications (3DSP, A2DP, AVRCP, BIP, BPP, CTN, DI, DUN, FTP, GAVDP, GNSS, GOEP, GPP, HCRP, HDP, HFP, HID, HSP, MAP, MPS, OPP, PAN, PBAP, SAP, SPP, SYNCH, VDP); active, legacy, withdrawn, deprecated, and/or subsequently introduced Bluetooth Protocol Specifications (AVCTP, AVDTP, BNEP, IrDA, MCAP, RFCOMM, 3WIRE, SD, TCP, UART, USB, WAPB); active, legacy, withdrawn, deprecated, and/or subsequently introduced Bluetooth Generic Attribute Profile (GATT) services, characteristics, declarations, descriptors, and profiles (ANP, ANS, AIOP, AIOS, BAS, BCS, BLP, BLS, BMS, CGMP, CGMS, CPP, CPS, CSCP, CSCS, CTS, DIS, ESP, ESS, FMP, FTMP, FTMS, GSS, GLP, GLS, HIDS, HOGP, HPS, HRP, HRS, HTP, HTS, IAS, IDP, IDS, IPS, IPSP, LLS, LNP, LNS, NDCS, OTP, OTS, PASP, PASS, PXP, PLXP, PLXS, RCP, RCS, RSCP, RSCS, TRUS, ScPP, ScPS, TDS, TIP, TPS, UDS, WSP, WSS); and/or other Bluetooth specifications, addendums, and/or supplements.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An access control device, comprising:
    a locking member operable to move between a locking position and an unlocking position to adjust a locked/unlocked state of the access control device;
    a lock state selector operable to cause the locking member to move between the locking position and the unlocking position to thereby adjust the locked/unlocked state between a locked state and an unlocked state;
    an electronic actuator configured to drive the locking member from the unlocking position to the locking position in response to receiving a lock signal;
    a controller in communication with the actuator and configured to transmit the lock signal in response to receiving a lockdown command; and
    a wireless transceiver in communication with the controller and configured to selectively establish a wireless communication connection with an external device, the wireless transceiver having a higher-power mode in which the wireless communication connection is established, the wireless transceiver having a lower-power mode in which the wireless communication connection is not established, wherein the wireless transceiver is operable to receive the lockdown command from the external device while operating in the lower-power mode;
    wherein the access control device has a standalone mode in which the access control device operates the wireless transceiver in the lower-power mode and the locked/unlocked state of the access control device is controlled locally;

wherein the access control device has a networked mode in which the access control device operates the wireless transceiver in the higher-power mode and communicates with the external device via the wireless communication connection;

wherein the access control device is configured to remain in the standalone mode in response to operation of the lock state selector;

wherein the access control device is configured to transition from the standalone mode to the networked mode in response to receiving the lockdown command; and wherein with the access control device operating in the networked mode, the controller is further configured to transmit the lockdown command to a second external device via the wireless transceiver.

2. The access control device of claim 1, further comprising a user-operable lockdown device configured to transmit the lockdown command when operated by a user.

3. The access control device of claim 1, wherein the wireless transceiver comprises a Bluetooth transceiver having an active mode corresponding to the higher-power mode and a sleep mode corresponding to the lower-power mode; and wherein the Bluetooth transceiver is operable to receive the lockdown command from the external device while operating in the sleep mode when paired with the external device.

4. The access control device of claim 1, wherein the wireless transceiver comprises a lower-power transceiver that is active in the lower-power mode and a higher-power transceiver that is active in the higher-power mode.

5. The access control device of claim 1, wherein the electronic actuator is further configured to drive the locking member from the locking position to the unlocking position in response to an unlock signal;

wherein the controller is configured to transmit the unlock signal in response to operation of the lock state selector in a first manner; and wherein the controller is configured to transmit the lock signal in response to operation of the lock state selector in a second manner.

6. The access control device of claim 1, wherein the controller is further configured to establish, via the wireless transceiver, a second wireless communication connection to a second external device when the access control device is operating in the networked mode.

7. An access control device having a locked/unlocked state, the access control device comprising:

a wireless transceiver;

a control assembly in communication with the wireless transceiver; and one or more non-transitory computer readable media connected with the control assembly and comprising instructions which, when executed by the control assembly, cause the access control device to:

selectively operate in a standalone mode, wherein to operate in the standalone mode comprises to permit local adjustment of the locked/unlocked state at the access control device; and selectively operate in a lockdown mode in response to receiving a first lockdown command, wherein to operate in the lockdown mode comprises to retain the locked/unlocked state as a locked state;

wherein the first lockdown command is received from a first external device; and wherein to operate in the lockdown mode further comprises to transmit, via the wireless transceiver and to a second external device, a second lockdown command.

8. The access control device of claim 7, wherein the second lockdown command is configured to cause a second access control device to operate in the lockdown mode.

9. The access control device of claim 7, further comprising a lock state selector operable to adjust the locked/unlocked state when the access control device is operating in the standalone mode; and wherein the lock state selector is inoperable to adjust the locked/unlocked state when the access control device is operating in the lockdown mode.

10. The access control device of claim 7, wherein the wireless transceiver is configured to selectively establish a wireless communication connection with the first external device;

wherein the wireless transceiver has a higher-power mode in which the wireless communication connection is established;

wherein the wireless transceiver has a lower-power mode in which the wireless communication connection is not established; and wherein the wireless transceiver is operable to receive the first lockdown command from the first external device while operating in the lower-power mode.

11. The access control device of claim 10, wherein the wireless transceiver comprises a Bluetooth transceiver having an active mode corresponding to the higher-power mode and a sleep mode corresponding to the lower-power mode; and wherein the Bluetooth transceiver is operable to receive the first lockdown command from the first external device while operating in the sleep mode when paired with the first external device.

12. The access control device of claim 10, wherein the wireless transceiver comprises a lower-power transceiver that is active in the lower-power mode and a higher-power transceiver that is active in the higher-power mode.

13. An access control device having a locked/unlocked state, the access control device comprising:

a wireless transceiver;

a control assembly in communication with the wireless transceiver; and one or more non-transitory computer readable media comprising instructions which, when executed by the control assembly, cause the access control device to:

selectively operate in a standalone mode, wherein to operate in the standalone mode comprises to permit local adjustment of the locked/unlocked state at the access control device; and selectively operate in a networked mode in response to receiving a first command, wherein to operate in the networked mode comprises to adjust the locked/unlocked state based upon information received via the wireless transceiver;

wherein the first command is received from a first external device;

wherein to operate in the networked mode further comprises to transmit a second command to a second external device; and wherein the second command is configured to cause a second access control device to operate in the networked mode.

14. The access control device of claim 13, wherein the first command comprises a lockdown command, and wherein to adjust the locked/unlocked state based upon information received via the wireless transceiver comprises to maintain the locked/unlocked state as a locked state.

15. The access control device of claim 13, wherein the wireless transceiver is configured to selectively establish a wireless communication connection with the first external device;
   wherein to operate in the standalone mode further comprises to operate the wireless transceiver in a lower-power mode in which the wireless communication connection is not established;
   wherein to operate in the network mode further comprises to operate the wireless transceiver in a higher-power mode in which the wireless communication connection is established; and
   wherein the wireless transceiver is operable to receive the lockdown first command from the first external device while operating in the lower-power mode.

16. The access control device of claim 13, further comprising a lock state selector operable to adjust the locked/unlocked state when the access control device is operating in the standalone mode; and
   wherein the lock state selector is inoperable to adjust the locked/unlocked state when the access control device is operating in the networked mode.

17. The access control device of claim 13, further comprising wherein the first external device comprises a user-operable lockdown device configured to transmit the lockdown first command when operated by a user.

* * * * *